United States Patent [19]

Budrose

[11] 3,860,961

[45] Jan. 14, 1975

[54] CARD ADAPTER FOR TAPE RECORDER

[76] Inventor: Charles R. Budrose, 127 Country Club Rd., Melrose, Mass.

[22] Filed: July 20, 1972

[21] Appl. No.: 273,441

[52] U.S. Cl. ...................... 360/88, 360/60, 360/130

[51] Int. Cl. ............................................ G11b 5/00

[58] Field of Search ............................ 274/4 R, 4 J; 179/100.2 MD, 100.2 D, 100.2 Z; 360/88, 60, 92, 130

[56] References Cited

UNITED STATES PATENTS

| | | | |
|---|---|---|---|
| 3,584,882 | 6/1971 | Krtous | 274/4 J |
| 3,678,212 | 7/1972 | Wild | 274/4 J |

*Primary Examiner*—Harry N. Haroian

*Attorney, Agent, or Firm*—Wolf, Greenfield & Sacks

[57] ABSTRACT

An adapter for insertion in a cassette receiving recess of a conventional cassette tape recorder/player accommodates a two track educational card and comprises means for changing from one track to the other track, its own transducer means and means for enabling the card to be moved from right to left rather than from left to right which is the conventional direction of tape movement. One of the tracks is a "student" track wherein recording, playback and erasing is permitted and the other track is an "instructor" track wherein preferably only playback is permitted. The adapter may also be provided with means for permitting recording, playback and erasing on the instructor track and may comprise interlock means for preventing a change from the student track to the instructor track when the cassette tape recorder/player is in the record mode of operation.

32 Claims, 8 Drawing Figures

Fig

CARD ADAPTER FOR TAPE RECORDER

FIELD OF THE INVENTION

The present invention relates in general to the art of recording and playback of auditory material preferably using a magnetic recording medium. More particularly, the present invention is concerned with a device adapted for attachment to or insertion in a conventional cassette-type tape recorder to permit the recording and playback of information from cards which preferably have two tracks.

BACKGROUND OF THE INVENTION

Card adapters presently exist for use in a conventional magnetic tape recorder to facilitate the recording and playback of information contained on one or more tracks of a card. One adapter of this type is shown in Pat. No. 3,610,635 issued Oct. 5, 1971 to Schiff et al. These known devices usually fit within the cassette receiving recess of the tape recorder and include means for guiding and moving the card past the transducer head of the tape recorder. One of the disadvantages associated with these known devices is that they can only be readily used with a recorder in which the sidewalls defining the cassette receiving recess are omitted. These sidewalls must be omitted, as taught by Schiff et al., in order to enable the card to transverse beyond the sides of the tape recorder as the information is recorded or played back. Thus, in conventionally available "deep well" tape recorders these known adapters can only be used, if at all, by altering the construction of the recorder and removing at least sections of the sidewalls defining the cassette receiving recess.

Another drawback associated with these known devices is that the card travel is usually from left to right as this is the normal direction of tape travel when a cassette is being used in the tape recorder. Because most people are right handed it would be more advantageous to have the card travel from right to left. Another disadvantage is that with these known devices it is necessary to remove the tape guide associated with the transducer head of the machine in order to permit the card to pass. If the machine is also used to accommodate cassettes there is, therefore, poor tape-head alignment.

The prior art does teach the use of separate tracks one for student use for recording and playback and one primarily only for instructor use which is preferably not altered by the student but is only used for playback. Although these prior devices have provided some means for preventing recording on the instructor track, they have not provided sufficient means for preventing recording on the instructor track under virtually almost any operating and/or fault conditions.

OBJECTS OF THE INVENTION

Accordingly, it is a primary object of the present invention to provide an improved card adapter for use with a conventional cassette-type tape recorder to permit the recording and playback of information from cards which preferably have a magnetic track thereon.

Another object of the present invention is to provide a device in accordance with the primary object that may be readily inserted in or attached to a conventional cassette-type tape recorder without requiring the alteration thereof. The device of the present invention is readily usable with even deep-well cassette-type tape recorders.

A further object of the present invention is to provide a device in accordance with the primary object wherein the information bearing card is transported from right to left in contradistinction to the usual movement of left to right, thereby making the device easier for use by a right-handed person.

SUMMARY OF THE INVENTION

To accomplish the foregoing and other objects of the present invention, there is provided a device for use with an audio recording-reproducing machine having means defining a cassette receiving station usually in the form of a receiving recess, a conventional transducer head and tape drive means including a drive capstan. The device (adapter) in accordance with the present invention is for enabling the machine to accommodate a card having at least one track of magnetic recording tape thereon. The device basically comprises a base member for insertion into the cassette receiving station, means on the base member defining a guide channel for the card to pass along, a separate transducer means which is disposed above the transducer head of the recording-reproducing machine, and means coupling from the tape drive means of the recording-reproducing machine for moving the card along the channel. The means defining the channel includes a bottom wall or bar which is preferably movable between first and second positions and has a card resting surface for holding a bottom edge of the card. This card resting surface is disposed above the transducer head of the recording-reproducing machine. The guide channel is preferably defined by a pair of spaced upstanding walls one of which provides access for the transducer means and the other of which provides access for the card moving means. It is also preferred that a holding means be provided having the transducer means and card moving means disposed at opposite ends thereof.

In accordance with one aspect of the present invention the card moving means includes a lower capstan-driven wheel, an upper card-contacting wheel and intercoupling shaft means. The transducer means includes means for mounting the transducer means including a spring plate and adjusting means for accurately controlling the gap between the transducer means and the card moving means.

In accordance with another aspect of the present invention there is provided a manually operable means coupled to said holding means for displacing the holding means and in turn the card moving means away from the drive means of the machine to thereby permit insertion of the card in the device in a proper position prior to enabling the movement of the card along the guide channel.

In accordance with a further aspect of the present invention the base member includes means defining a hole therein, means for selectively blocking and unblocking the hole, and means responsive to the guide channel bar being in a first position for unblocking the hole and being in a second position for blocking the hole. The first position is referred to hereinafter as the "instructor" position and the econd position as the "student" position. In the first position the hole is not blocked and the machine is prevented from recording. In the second position the hole is blocked and recording may take place as the bar is in the student position. A further interlocking means is provided which is responsive to the movement of the transducer head of the reproducing-recording machine for preventing the bar from being moved down from the student position to the instructor position when the recording machine is in either the playback or the record mode. In order to operate the device the machine must be switched to a position other than the record or playback position and the bar can then be displaced to the student position.

BRIEF DESCRIPTION OF THE DRAWINGS

Numerous other objects, features and advantages of the invention will now become apparent upon a reading of the following detailed description taken in conjunction with the accompanying drawings in which.

DETAILED DESCRIPTION

Figure 1:
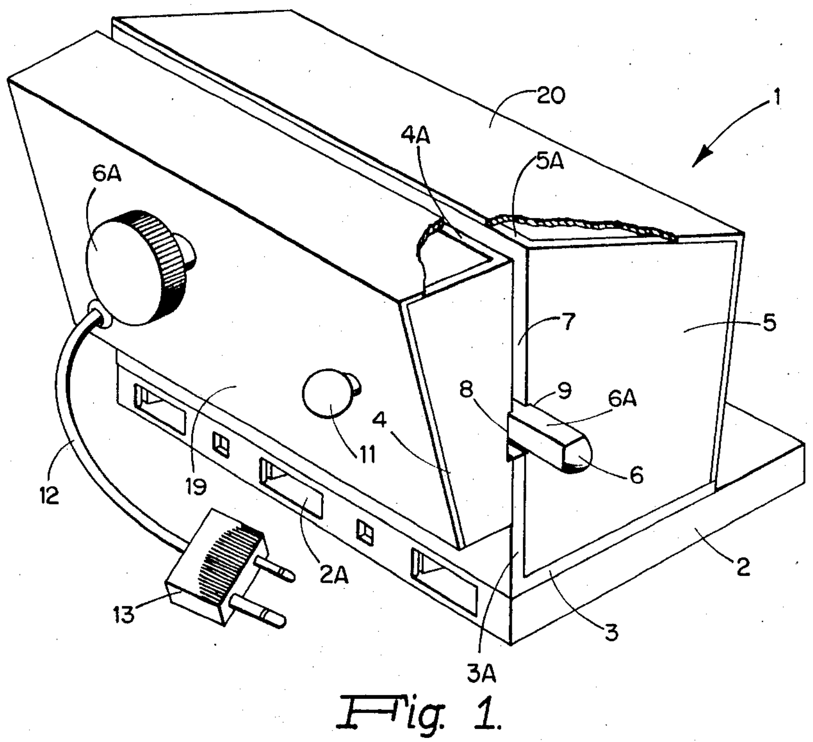
FIG. 1 is a perspective view of a card adapter constructed in accordance with the principles of the present invention.

Referring now to the drawings and in particular to FIG. 1, there is shown a perspective view of an adapter 1 constructed in accordance with the principles of the present invention. The adapter generally comprises a base member 2, an L-shaped supporting platform 3, channel forming member 4 and 5, and a track or bar 6 along which a recording card is transported. The facing walls 4A and 5A of members 4 and 5, respectively, along with the top surface 6A of track 6 define the card accommodating channel 7.

The base member 2 may be basically constructed from a conventional tape cassette with the tape reels removed and includes openings for aligning with the capstan drive of the tape recorder and also the spindles of the tape recorder. This base member 2 is also provided with blocking means as discussed hereinafter with reference to FIGS. 3 and 6. The base member 2 includes an opening 2A for receiving the transducer of the tape recorder when the adapter is inserted into the tape recorder.

The L-shaped supporting platform 3 is secured to the base member 2 by any suitable means, and the lower ends of walls 4A and 5A are also suitably secured to the upstanding leg 3A of platform 3. The walls 4A and 5A have longitudinal grooves 8 and 9, respectively, cut thereinto and the track 6 fits within the grooves but is confined in its movement vertically between the upper and lower edges of these grooves. In the position shown in FIG. 1 the bar 6 is in its uppermost position. A position knob 6A is rotatable to move the bar 6 between its upper and lower positions. The mechanism for facilitating this operation is shown and discussed in more detail hereinafter with reference to FIGS. 6 and 7.

Figure 2:
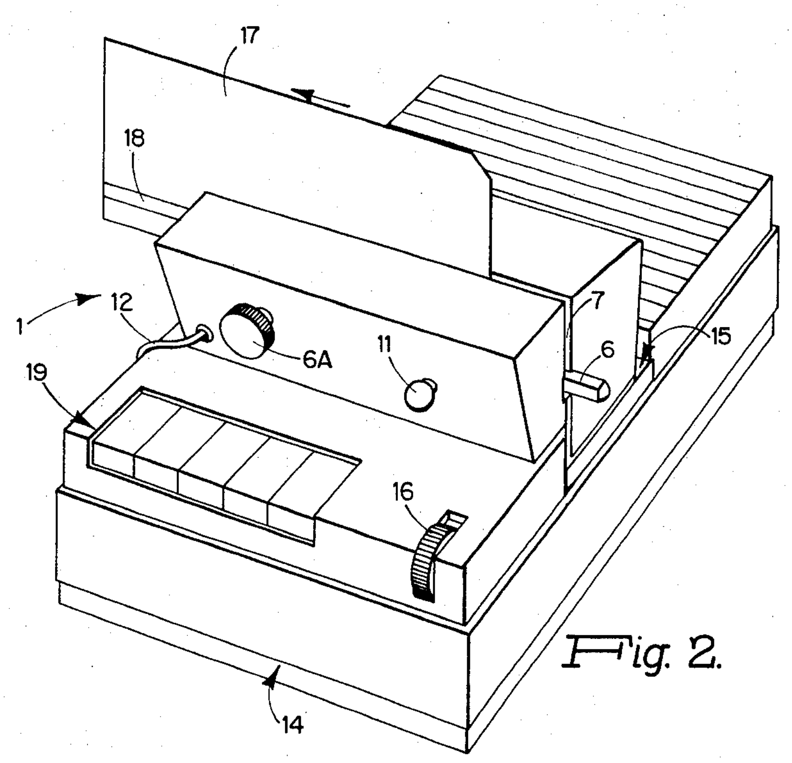
FIG. 2 is a perspective view showing the device of FIG. 1 inserted in a conventional tape recorder.
Figure 3:
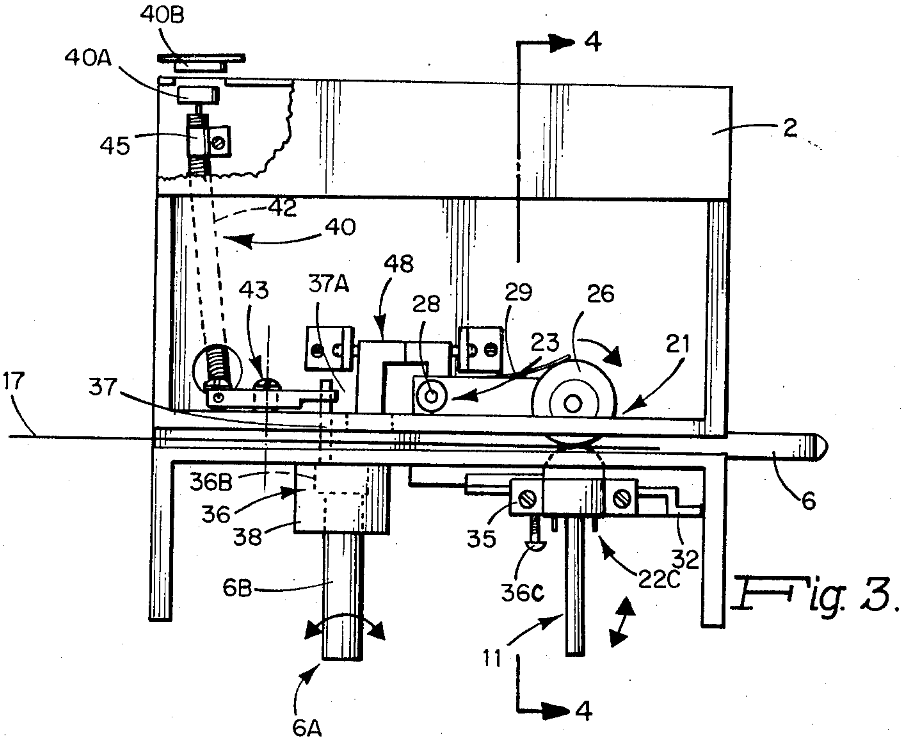
FIG. 3 is a partially cut away top view of the device of FIG. 1.
Figures 4, 5:
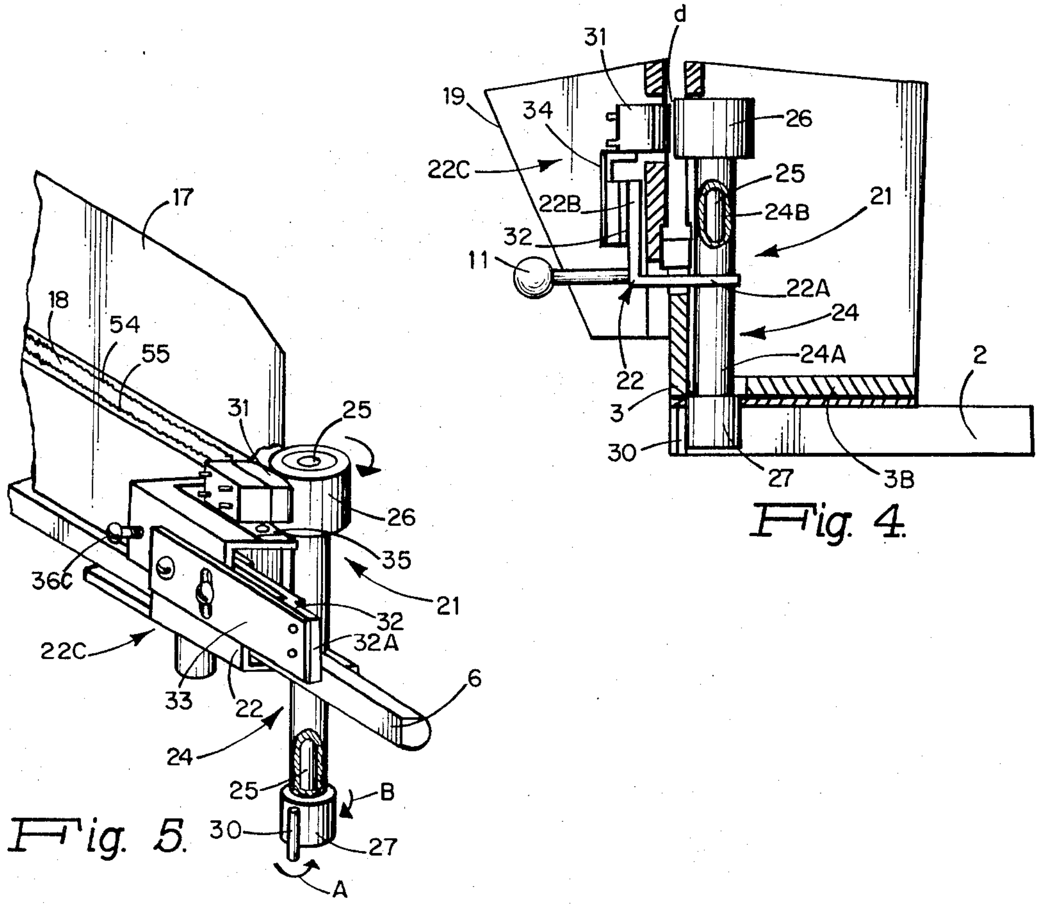
FIG. 4 is a cross-sectional view taken along line 4—4 of FIG. 3.
FIG. 5 is a partial perspective view showing the card, card moving means, and transducer means of the present invention in somewhat more detail.

FIG. 1 also shows knob 11 which couples to the card drive mechanism, shown in more detail in FIGS. 3 and 5, and is depressed to permit insertion of the card 17 (see FIG. 2) in the channel 7 with the drive means being temporarily disabled, and may be released for permitting the drive means to propel the card through the guide channel. The adapter is also provided with a cable 12 and associated plug 13 which couples from the transducer head located in the adapter and is insertable within a mating female connector of the tape recorder 14.

FIG. 2 shows a conventional tape recorder 14 having the card adapter 1 removably installed in the cassette received recess 15 of the recorder in place of a standard tape cassette. Card 17 has a strip of recording medium 18 affixed thereto, and in FIG. 2 the card is shown traversing from the right to the left in guide channel 7.

The tape recorder 14 may be of conventional design and in FIG. 2 is shown as including an on-off volume knob 16 and push button array 19. The five buttons which comprise array 19 may include a rewind button, forward button, record button, playback button and stop button.

For a more comprehensive discussion of the operation of the adapter of the present invention, reference is now made to FIGS. 3–5 which show the card drive assembly 21. Assembly 21 comprises a right angle support platform 22, a pivot member 23 (see also FIG. 6), and a wheel support member 24. The right angle support platform 22 includes a horizontal leg 22A for supporting the wheel supporting number 24, and a vertical leg 22B for supporting the transducer assembly 22C.

Figure 6:
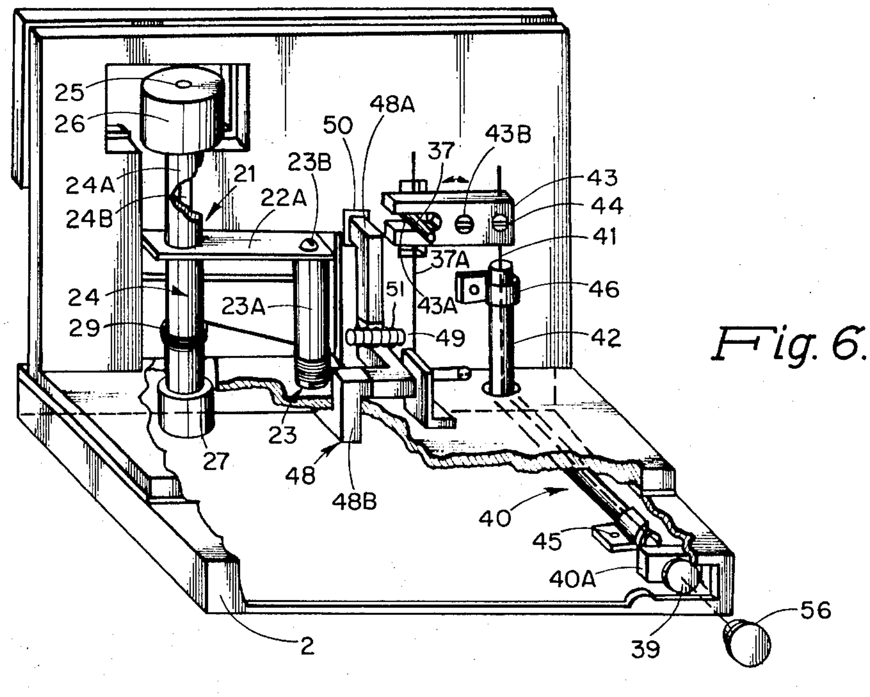
FIG. 6 is a perspective back view of the device shown in FIGS. 1 and 3 with the base member partially cut away.

The leg 22A has the pivot member 23 affixed to one corner thereof as depicted in FIG. 6. The other end of member 23 is secured to the top surface of the bottom leg 3B of the L-shaped supporting platform. The pivot member 23 may include an outer tubular casing 23A surrounding an inner elongated screw 23B which extends through casing 23A and is threaded into a mating tapped hole in leg 3B.

The wheel support member 24 also includes an outer tubular casing 24A which is fixed to an opposite corner of horizontal arm 22A at approximately the mid point between the ends of the tubular casing. A rotatable shaft 24B is disclosed within casing 24A and connects at its top and bottom ends to card drive wheel 26 and capstan-driven wheel 27, respectively, both of which may be composed of rubber and fixed in relative rotation. The shaft 24B is mounted in bushings at the ends of casing 24A for facilitating easy rotation thereof.

Pivot member 23 is mounted over a pivot shaft 23A allowing the card drive assembly 21 to swing around pivot shaft 23A. A spring 29 is provided around the bottom end of pivot member 23, and couples over wheel support 24. Spring 29 urges the card drive assembly 21 and its associated wheel support member 24 forward, and when the adapter is inserted into the tape recorder the capstan driven wheel 27 is positioned against the capstan 30 of the recorder. FIG. 5 shows by means of arrows A and B, the direction of movement of the capstan 30 and driven wheel 27, respectively. FIG. 4 shows the knob 11 which extends outside the cover 19 and is fixed preferably by threaded engagement, to the bottom end of leg 22B of the support platform. When this knob 11 is depressed the entire card drive assembly 21 including transducer means 22C is urged backwards against the tension of spring 29 and the card driven wheel 27 becomes spaced from capstan 30.

When the tape recorder 14 is in the record or playback mode the capstan 30 rotates in the direction indicated in FIG. 5 and drives the capstan driven wheel 27 in the opposite direction. This rotation is then transmitted by way of drive shaft 24B to the card drive wheel 26. The relative position of the wheel 26 and transducer assembly 22C is clearly depicted in FIG. 3.

The transducer assembly 22C is most clearly shown in FIG. 5 and comprises transducer head 31, mounting member 32, spring member 33, and head bracket 34. The mounting member 32 (see FIG. 4) is fastened at one end directly to upright leg 22B of right angle support platform 22. The opposite end 32A of the mounting member has an extending shoulder and has one end of the head spring 33 fixed thereto such as by use of conventional rivets. The head bracket 34 is fixed to the head spring 33 at its opposite end and the transducer head 31 is mounted on the horizontal surface of the head bracket 34 by means of a head strap 35. The vertical portion of the head bracket 34 has a tapped hole for accommodating an adjusting screw 36C which extends through bracket 34 and bears against mounting member 32. The screw 36C is used to adjust the distance *d* between the transducer head 31 and the card drive wheel 26 (see FIGS. 3 and 4). This distance should be approximately .003 inches. This distance is maintained whether the knob 11 is in its normal drive position or depressed position.

When the device 1 is inserted in the tape recorder 14 the spacing *d* may be checked and possibly adjusted by means of adjusting screw 36C. In normal operation the insert button 11 is used to install the device in the recorder. The card is inserted in the righthand end of the channel and is propelled therethrough by the card drive mechanism. In some instances the button 11 may be depressed to permit alignment of the card in the guide channel.

Figure 7:
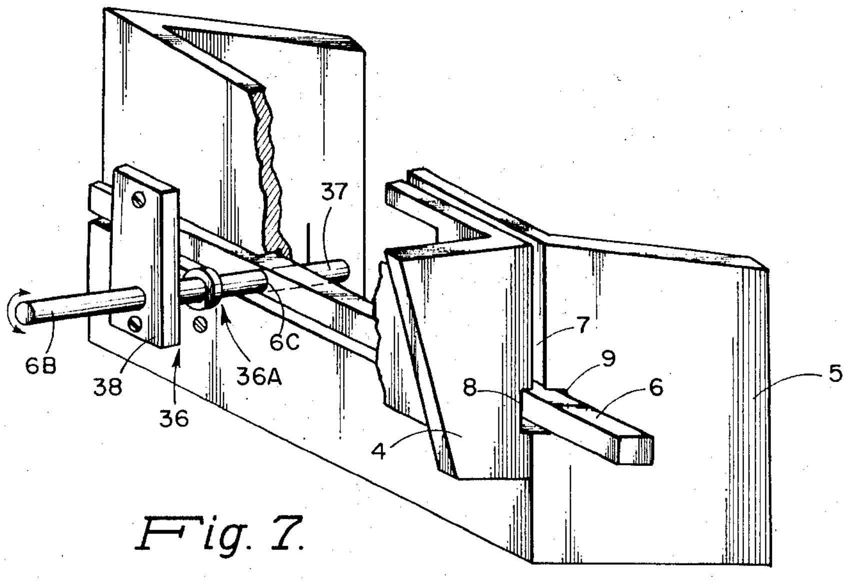
FIG. 7 is a partial perspective view of the device of FIG. 1 with the covers removed particularly showing the eccentric means for displacing the channel defining bar.

As mentioned previously the card 17 has electromagnetic recording strip 18 extending therealong and positioned as shown in FIG. 3 so that the card comes into intimate contact with the magnetic core (not shown) of transducer head 31. The magnetic strip 18 includes an upper instructor track 54 and a lower student track 55. The spacing between these two tracks is the same spacing provided between the upper and lower positions of bar 6. The top and bottom edges of the grooves 8 and 9 define the upper and lower positions of the track. The track is moved between the upper and lower positions by the track shift means 36 which is shown in FIGS. 6 and 7.

Means 36 comprises a two-position knob 6A, an eccentric means 36A, and rocker arm assembly 43. FIG. 6, along with FIG. 3 also shows blocking means 40. The two-position button 6A is coupled directly to a fixed shaft 6B, the other end of which extends into support block 38. The support block 38 also contains an eccentric means 36A which includes an off-center positioned shaft 37 which extends through an aperture 6C in track 6, as shown in FIG. 7, and contacts rocker arm 43. Means 36A also includes collar 36B from which shaft 37 extends. FIG. 7 shows the collar separated from the block 38. FIG. 3 shows the collar in place in an accommodating recess of block 38. The walls 4A and 5A of the members 4 and 5 have appropriate openings for accommodating the output shaft 37 of the eccentric means. A spring means 37A which is attached to the base member urges the shaft 37 towards the center of the rocker arm 43. The support member 38 is fixed to the outside of the wall 4A by suitable means. The spring 37A maintains shaft 37 in either of its two alternate positions.

The rocker arm 43 includes a U-shaped recess 43A at one end for accommodating the end of shaft 37, a pivot point 43B, and a locking screw 44 disposed at the opposite end of rocker arm 43 for tightly holding a flexible shaft 41 which extends to the blocking means 40. The blocking means 40 comprising a sleeve 42 for housing the flexible shaft 41. This sleeve 42 is clamped by clamp 46 at one end to wall 5A adjacent the rocker arm 43, and is clamped to the inside of the base member at the other end by bracket 45. At the opposite end of the flexible shaft 41 there is provided a cylindrical block 40A for slidably moving in and out of aperture 39 disposed at the rear of the base member 2. When the knob 6A is rotated in a first direction and track 6 is in its upper position the rocker arm 43 is rotated clockwise as viewed in FIG. 6, and the blocking cylinder 40A is disposed in recess 39. Alternatively, when the track is in its lower position, the rocker arm 43 is rotated counterclockwise and the cylindrical blocking member 40A is withdrawn inwardly of the base member and does not block the recess 39. In the blocked position, it is noted that member 40A actuates on adjacent switch 40B which forms part of the tape recorder. It is the actuation of switch 40B that permits recording and playback in the student position. The operation of this blocking means is discussed later in conjunction with the overall operation of the device.

As discussed previously, one of the tracks is the student track and the other is the instructor track. In the embodiment shown, the device is in the student position when the track 6 is in its upper position, and is in the instructor position when it is in its lower position. During normal operation the user can both record messages on and playback messages from the recording medium along path 55 when the track 6 is in the student (upper) position. When the track is moved to the instructor position the path 54 is aligned with the transducer head and the user may only play messages back from the recording medium and cannot record thereon. It is the blocking means 40 that provides this operation. Thus, when the knob 6A is turned to the student position the rocker arm 43 rotates clockwise and the blocking cylinder 40A is disposed in aperture 39. This action causes the actuation of responsive switch 40B of the tape recorder which permits both recording and playback. When the knob 6A is rotated to its other position the track 6 assumes its lower position, the rocker arm 43 rotates counter-clockwise and the opening 39 is unblocked. Switch 40B is deactuated thereby permitting only playback. This is the same type of action that occurs when a pre-recorded tape cassette is introduced into the tape recorder and it is not desired to record on the tape.

The above-defined feature prevents the tape recorder from assuming the record mode when the track is in the instructor position. However, this mechanism does not prevent the user from moving the track from the student position to the instructor position while the tape recorder is in record mode. Although with the use of the blocking means 40 recording should not take place there may be a malfunction. Thus, the present invention provides an additional interlock means that prevents movement of the track from the student position to the instructor position if the tape recorder is in the record or playback mode.

In order to provide this interlock feature the apparatus of the present invention comprises interlock means 48, (see FIGS. 3 and 6) which comprises a track lock lever 48A which is rotatably mounted on the pivot shaft 49 which may be secured from channel defining member 5 which is provided with an opening 50 for receiving the end of lever 48A. When the track 6 is in the upper position the lever 48A may be moved into the opening 50 and thus prevent movement of the track from the upper to the lower position as the lever will be positioned under the track. The second lock lever 48B is also rotatably mounted onto the shaft 49, extends down into base 2 and is spring-loaded by means of spring 51 so as to be urged toward the opening 2A (see FIG. 1) in base member 2. When the tape recorder 14 is put into either the record or playback modes, it is conventional that the recording head of the tape recorder move into the opening 2A in the base member 2. This movement of the transducer head urges the lower lever 48B against the tension of spring 51 and the upper lever 48A pivots about pivot shaft 48 into the opening 50, thereby preventing the track 6 from being moved from its upper position to its lower position. Spring 51 operates to hold lever 48A against lever 48B except when lever 48A is inhibited by the track 6 being in its lower position. There is a stop (not shown) which allows only partial rotation of lever 48A toward lever 48B so that when lever 48B is all the way forward into opening 2A, lever 48A is not in opening 50.

One way of conveying the recorded information from the transducer head of the adapter to an amplifier (not shown) of the tape recorder is shown in FIG. 1 and includes cord 12 and plug 13. In another embodiment, however, the adapter may comprise an amplifier and a second transducer which is electromagnetically coupled to the transducer head of the recorder for conveying recorded information on the card.

Figure 8:
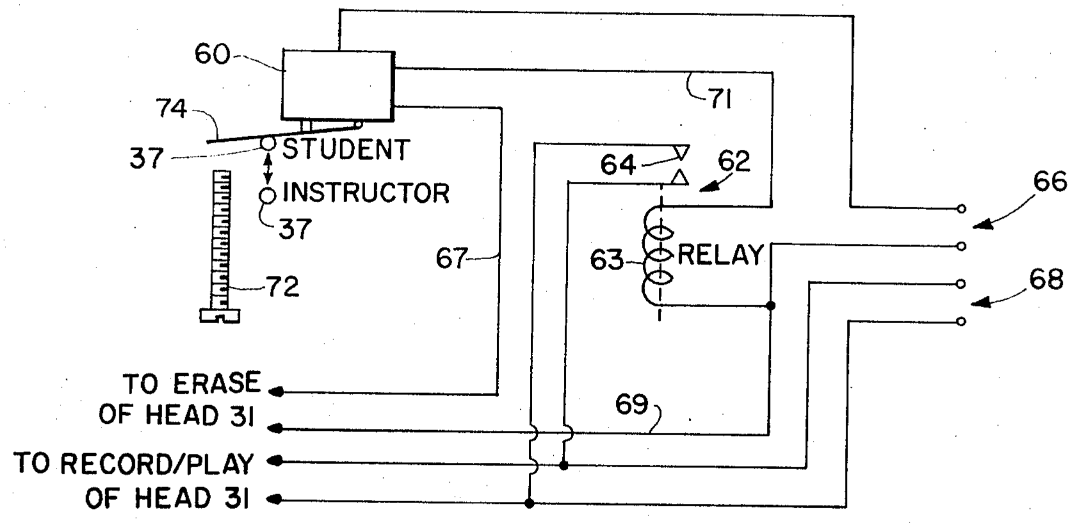
FIG. 8 is a circuit diagram of an interlock feature of the present invention.

Referring now to FIG. 8, there is shown a circuit diagram of another feature of the present invention for preventing erasing or recording when in the instructor position. This circuitry is responsive to the position of the card track 6 which is in turn controlled by track shaft 37 (see FIG. 6). The circuitry basically includes single pole/double throw switch 60 and relay 62 which includes a relay coil 63 and associated contacts 64 which are shown in their open (de-energized) position. A two-wire erase line 66 coupled from the recorder, possibly by way of multiwire cable 12, to switch 60 and relay coil 63. The two-wire record/play line 68 couples to the record/play portion of transducer head 31 and also to the contacts 64 of the relay. Lines 67 and 69 couple respectively from switch 60 and coil 63 to the erase portion of transducer head 31.

In operation, when the recorder is in the playback mode there is no erase voltage on line 66 and cards can be played in either the student or instructor position. The line 68 to head 31 is not shorted out by contacts 64. When the tape recorder is in the record mode of operation and bar 6 is in the student (upper) position the switch 60 couples the erase voltage, if present, to line 67 and from thence to head 31. Relay 62 is not energized via line 71 as that contact of the switch is closed and thus recording can take place. Contacts 64 are still open. When the tape recorder is in the record mode of operation and the bar 6 is in the instructor (lower) position the switch 60 couples the erase voltage, if present, to line 71 thereby energizing relay 62 and closing its contacts 64. Under these conditions line 68 is shorted out and neither erasing nor recording is permitted. Line 67 is open.

The circuitry shown in FIG. 8 can be contained in a relatively small unit and is preferably secured to the inside surface of wall 5A adjacent to shaft 37. FIG. 8 also depicts an override screw 72 which may extend through the base of the adapter. When this screw is turned toward contact arm 74 the switch 60 is maintained in the student position (relay 62 de-energized) and erasing and recording can take place on the instructor track.

Having described a limited number of embodiments of the present invention, it should now be obvious that numerous other embodiments will fall within the spirit and scope of the present invention which is defined by the appended claims.

What is claimed is:

1. A device for use with an audio recording-reproducing machine having means defining a cassette receiving station, a transducer head and tape drive means;

- said device for enabling said machine to handle a card having at least one track of magnetic recording medium thereon and comprising:
- a base member received at said cassette receiving station,
- means on said base member defining a guide channel for said card to pass along including a bottom wall having a card resting surface for holding an edge of the card and being disposed above the transducer head of the recording-reproducing machine,
- and means coupling from the tape drive means of said recording-reproducing machine for moving said card along said channel,
- said means defining a guide channel being configured to provide operative access for said transducer means to said card and for said card moving means to said card,
- said means defining a guide channel including a pair of spaced upstanding walls one of which provides access for the transducer means and the other of which provides access for the card moving means,
- and including means extending through openings in said walls below said transducer means for holding said card moving means at one end thereof and said transducer means at the other end thereof.

2. The device of claim 1 wherein said holding means includes an L-shaped bracket pivotally secured at the one end to said base member.

3. The device of claim 1 wherein said card moving means includes a lower capstan-driven wheel, an upper card-contacting wheel and shaft means intercoupling said lower and upper wheels.

4. The device of claim 3 wherein said shaft means is fixedly attached at the one end of the holding means at a point intermediate the upper and lower wheels and further comprising pivot means secured from the base member and to the one end of the holding means but spaced from said shaft means for enabling relative movement of said card moving means and said means defining a guide channel.

5. The device of claim 4 wherein said upper wheel and transducer means are arranged with a small gap therebetween, said gap being in line with said channel.

6. The device of claim 5 wherein said gap is on the order of 0.003 inches.

7. The device of claim 5 comprising means for adjusting the gap between said transducer means and upper wheel.

8. The device of claim 7 wherein said adjusting means includes a support plate secured to the other end of said holding means, a spring plate secured to said support plate for carrying said transducer means and an adjusting screw threadedly engaged with a threaded hole in said spring plate and bearing against said mounting plate.

9. The device of claim 4 wherein said upper and lower wheels are of different diameter.

10. The device of claim 9 wherein said upper wheel is of larger diameter than said lower wheel.

11. The device of claim 4 wherein said upper wheel rotates oppositely to the capstan of said machine.

12. The device of claim 1 wherein said card moving means includes at least one wheel contacting said card which rotates oppositely to the capstan of said machine.

13. The device of claim 1 wherein said bottom wall comprises a vertically movable bar adapted to assume first and second positions.

14. The device of claim 1 including manually operable means coupled to said holding means for displacing said holding means and in turn said card moving means away from the drive means of the machine to thereby permit insertion of a card in the device in proper position.

15. A device for use with an audio recording reproducing machine having means defining a cassette receiving station, a transducer head and tape drive means;

said device for enabling said machine to handle a card having at least one track of magnetic recording medium thereon and comprising:

a base member received at said cassette receiving station, means on said base member defining a guide channel for said card to pass along including a bottom wall having a card resting surface for holding an edge of the card and being disposed above the transducer head of the recording-reproducing machine, and means coupling from the tape drive means of said recording-reproducing machine for moving said card along said channel, said means defining a guide channel being configured to provide operative access for said transducer means to said card and for said card moving means to said card, said means defining a guide channel including a pair of spaced upstanding walls one of which provides access for the transducer means and the other of which provides access for the card moving means, said bottom wall comprising a bar and said pair of walls has means limiting the bar between first and second vertically disposed positions.

16. The device of claim 15 wherein said limiting means includes elongated slots respectively disposed in said walls for accommodating said bar.

17. The device of claim 15 comprising means coupled to said bar for displacing it vertically to either the first or second position.

18. The device of claim 17 wherein said displacing means includes an eccentric means secured to one of said walls and having a shaft extending through a hole in said bar for causing a movement thereof.

19. The device of claim 17 wherein said base member includes means defining a hole therein, means for selectively blocking and unblocking said hole, and means responsive to said bar being in the first position for unblocking said hole and being in the second position for blocking said hole.

20. The device of claim 19 wherein the means responsive to said bar includes a lever having one end coupled to said displacing means and the other end coupled to said means for selectively blocking and unblocking.

21. The device of claim 15 comprising interlock means responsive to movement of the transducer head of said machine wherein said recording position for preventing said bar assumes the first position.

22. The device of claim 21 wherein said first position is the lower position of said bar and said interlock means includes lever means and limiting means selectively insertable under said bar for preventing downward movement thereof.

23. A device for use with an audio recording-reproducing machine having means defining a cassette receiving station, a transducer head and tape drive means;

said device for enabling said machine to handle a card having at least one track of magnetic recording medium thereon and comprising:

a base member received at said cassette receiving station, means on said base member defining a guide channel for said card to pass along including a bottom wall having a card resting surface for holding an edge of the card and being disposed above the transducer head of the recording-reproducing machine and means coupling from the tape drive means of said recording-reproducing machine for moving said card along said channel, said means defining a guide channel being configured to provide operative access for said transducer means to said card and for said card moving means to said card, wherein said bottom wall comprises a moveable bar that is manually displaceable, said base member including means defining an opening therein, means for blocking and unblocking the opening, and means responsive to said bar being in the first position for unblocking said hole and being in the second position for blocking said hole.

24. The device of claim 23 wherein said card has two tracks, the first being in operative relation to said transducer means when said bar is in the first position and the second track being in operative relation to said transducer means when said bar is in the second position.

25. The device of claim 24 wherein recording is permitted in said second position.

26. A device for use with an audio recording-reproducing machine having means defining a cassette receiving station, a transducer head and tape drive means;

said device for enabling said machine to handle a card having at least one track of magnetic recording medium thereon and comprising:

a base member received at said cassette receiving station, means on said base member defining a guide channel for said card to pass along including a bottom wall having a card resting surface for holding an edge of the card and being disposed above the transducer head of the recording-reproducing machine, and means coupling from the tape drive means of said recording-reproducing machine for moving said card along said channel, said means defining a guide channel being configures to provide operative access for said transducer means to said card and for said card moving means to said card, wherein said bottom wall comprises a vertically movable element for receiving said card and adapted to assume first and second positions.

27. The device of claim 26 comprising means for moving the element between said first and second positions.

28. The device of claim 27 comprising circuit means coupled intermediate said machine and said transducer means and responsive to said element being in said first position for preventing erasing and recording on said card even when in the record mode of operation of said machine.

29. The device of claim 28 wherein said circuit means comprises a switch responsive to said means for moving the element, and a shunting means responsive to said element being in said first position for shunting the signal from said machine to said transducer means.

30. The device of claim 29 wherein said shunting means includes a relay and said switch includes a single pole/double throw switch.

31. The device of claim 28 comprising an over-ride means for conditioning said circuit means to permit recording in said first position.

32. A device for use with an audio recording-reproducing machine having means defining a cassette receiving station, a transducer head and tape drive means;

said device for enabling said machine to handle a card having at least one track of magnetic recording medium thereon and comprising:

a base member received at said cassette receiving station, means on said base member defining a guide channel for said card to pass along including a bottom wall having a card resting surface for holding an edge of the card and being disposed above the transducer head of the recording-reproducing machine, means coupling from the tape drive means of said recording-reproducing machine for moving said card along said channel, manually operable means coupled to said means for moving the card for displacing said card moving means away from the drive means of the machine to at least temporarily disable the card moving means;

and bias means for urging said card moving means against the capstan of said tape drive means when said manually operable means is released.

* * * * *